United States Patent [19]

Landers et al.

[11] 4,384,552

[45] May 24, 1983

[54] GAS PRODUCING AND HANDLING DEVICE

[75] Inventors: Frederick W. Landers; Jerry M. Collins, both of West Plains; David Jessee, Sycamore, all of Mo.

[73] Assignee: Perennial Energy, Inc., Dora, Mo.

[21] Appl. No.: 372,310

[22] Filed: Apr. 27, 1982

[51] Int. Cl.³ .............................................. F02B 43/00
[52] U.S. Cl. ........................................... 123/3; 48/184
[58] Field of Search .................. 123/3; 48/184, 197 A; 261/DIG. 68; 210/170, 603

[56] References Cited

U.S. PATENT DOCUMENTS

| 2,244,111 | 6/1941 | McKee | 48/184 |
|---|---|---|---|
| 2,640,027 | 5/1953 | McNamee et al. | 210/2 |
| 3,338,826 | 8/1967 | Kramer | 210/12 |
| 3,528,787 | 9/1970 | Hallberg | 48/184 |
| 3,838,199 | 9/1974 | Coe et al. | 426/55 |
| 3,972,811 | 8/1976 | Larkins, Jr. et al. | 123/3 |
| 3,981,803 | 9/1976 | Coulthard | 48/197 A |
| 4,040,953 | 8/1977 | Ort | 48/197 A |
| 4,057,401 | 11/1977 | Boblitz | 48/197 A |
| 4,169,712 | 10/1979 | Boyce et al. | 48/197 A |
| 4,208,279 | 6/1980 | Varani | 48/197 A |
| 4,274,838 | 6/1981 | Dale et al. | 210/180 |

Primary Examiner—William A. Cuchlinski, Jr.
Attorney, Agent, or Firm—Litman, Day and McMahon

[57] ABSTRACT

A gas producing and handling system is provided comprising a rigid reservoir enclosure containing a continuous and variable supply of gaseous fuels and a suitable engine capable of utilizing the total amount of fuel provided by the gas supply for producing electrical energy. The gas supply comprises an anaerobic digester adapted to receive organic waste and which is in gaseous flow communication with the engine. The engine has a supply regulated throttle responsive to gaseous pressure in the anaerobic digester. Upon the increased production of gas such that the gaseous pressure in the digester increases, the throttle regulator controls the throttle setting of the engine to increase the output of the engine to fully use the gas supplied by the digester, thereby eliminating the need for auxiliary gas storage devices.

15 Claims, 6 Drawing Figures

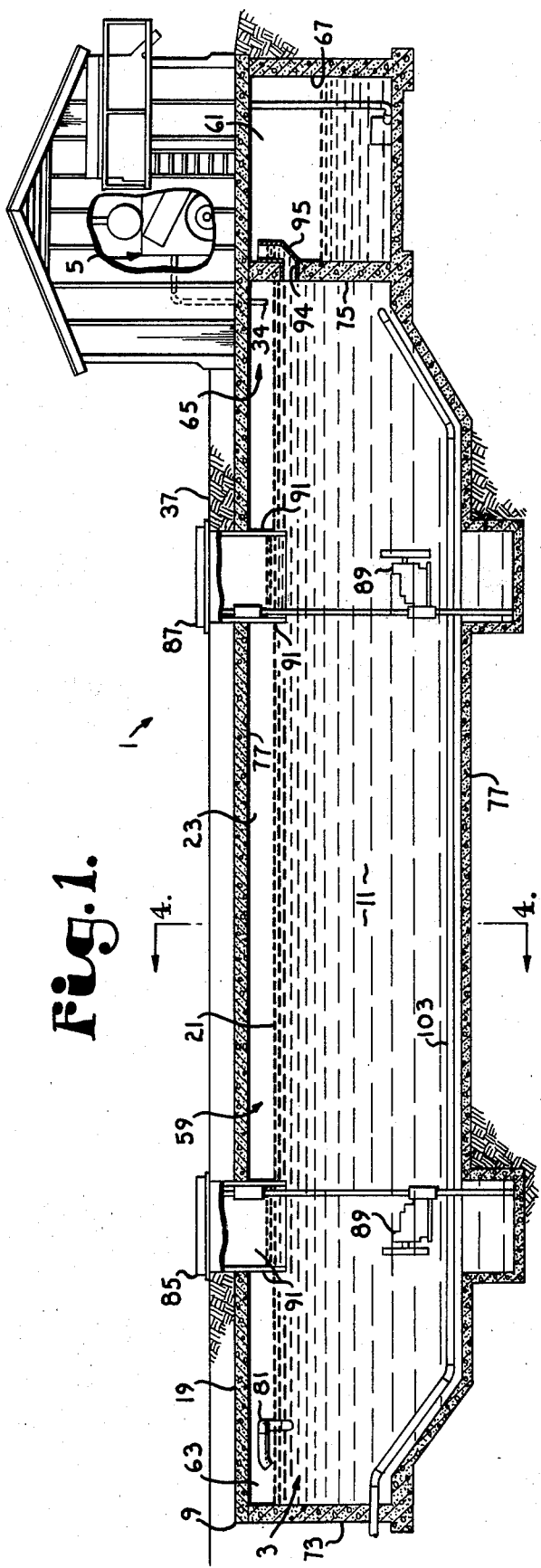

GAS PRODUCING AND HANDLING DEVICE

BACKGROUND OF THE INVENTION

This invention relates to gas producing and handling systems and, in particular, to such systems which produce a combustible gas for burning in an internal combustion engine coupled to an electrical generator.

There are presently many instances where a combustible gaseous fuel, such as methane, is produced as a by-product of other processes, such as in anaerobic digesters. It has long been known that anaerobic digesters can be utilized in decomposing organic waste, such as animal manure, so that the resulting decomposed matter is less offensive and less damaging to the environment. Anaerobic decomposition produces various gaseous by-products including carbon dioxide and combustible methane gas. Until the last decade, because the cost of petroleum and other energy sources has been relatively low, it has not been economically feasible to attempt to collect and utilize the methane produced by the digesters to produce energy such as in electricity. Because of the events of the last decade, particularly concerning the supply of petroleum fuels, the cost of producing energy has increased to an extent where it is now economically feasible to attempt to utilize the methane produced by the anaerobic digesters to produce a usable form of energy. Typically, the methane gas produced by the anaerobic digesters fuels an internal combustion engine which drives a generator for producing electricity. Also, the methane gas can be used as fuel in appliances converted from operation on natural gas.

A major problem encountered in attempts to utilize the methane gas produced by the digester concerns the need to store the gas when the total amount of gas being produced by the digester is either not used fully by the various appliances utilizing the gas or is not being combusted in the internal gas engine for driving the electrical generator. Prior attempts to overcome this problem have included furnishing a large storage tank with the digester or, at times, including a compressor to compress the gas in volume for easier storage. Another recent example of an attempt to overcome the storage problem is a digester having an expansible cover secured over the decomposing matter. As more gas is produced, the cover expands to a greater volume to store the gas and vice verse. A major problem with this manner of storage aside from the fact that the expansible bag can be punctured and leak is that most users enclose the digester in a suitable building to protect the bag, thereby increasing the expense of the system.

The gas storage problem encountered by prior digesters which use methane gas in an engine coupled to a generator for the production of energy is two-fold. First, the associated generator is a synchronous generator which must be rotated at a certain predetermined speed or revolutions per minute (rpm) so that alternating electrical current produced thereby is compatible with utilization by the appliances of the user. Secondly, the consumption of fuel by the generator is determined by the demand placed on it. As a result, the consumption and production rates of gas are different resulting in a need for a storage vessel for any excess gas produced and not contemporaneously consumed by the engine.

There are many other types of potential gas supplies which presently are not being utilized but, which also have the attendant problem of fuel storage.

SUMMARY OF THE INVENTION

The present invention comprises a gas producing and handling system allowing a user to consume all of the gas produced by a variable production supply reservoir in an internal combustion engine coupled to an electrical generator. The gas supply is covered with a rigid structure which is in flow communication with an intake apparatus of an associated internal combustion engine which drives an induction generator. The utilization of an induction generator permits electricity to be produced and fed back into the power lines of the local utility when the generator is rotated at any rpm greater than the synchronous speed of the generator. As such, the generator is constantly producing power even as its speed fluctuates, if the rpm is above a certain figure. This allows the consumption of the engine to vary for total consumption of the gas produced by the gas supply.

The engine intake apparatus includes a carburetor having a throttle which is connected to a supply sensing throttle regulator. The supply sensing throttle regulator senses the gaseous pressure of the fuel within the rigid enclosure. As more gaseous fuel is being produced, the pressure inside the rigid enclosure will increase. The pressure sensing throttle regulator will sense or read the increase in pressure and cause the throttle of engine to open for increasing the output and hence, the fuel consumption of the engine. In doing so, the gas consumption of the engine is directly related to the gas production of the supply so that all of the gas produced by the supply is continuously being consumed and utilized in the engine. This method of operation eliminates the need for any auxiliary gas storage vessels.

A typical example of such a gas supply reservoir is an anaerobic digester which comprises a rigid tank in which a slurry of organic waste products such as manure is received. The tank has a top which is typically approximately two feet above a surface of the slurry and leaves a small volumetric gas space for the collection of gasses emitted by the decomposing slurry. The gas space of the digester is in gaseous flow communication with the intake apparatus of the internal combustion engine for conveying the combustible gaseous fuels produced by the digester thereto. The supply sensing flow regulator is also in gaseous flow communication with the gas space of a digester and senses the pressure fluctuations therein.

The digester described herein is what is referred to as a plug flow digester in that a daily charge of slurry is directed into a front or influent end of the digester and forces a like volume of slurry out an effluent end of the digester into a separator where liquids are separated from the slurry, leaving a solid which is more easily used. The incoming charge is transferred to the digester through a pipe which emits the incoming slurry toward the front end wall of the digester and at a position above the level of the slurry and within the gas space. The incoming flow falls and contacts the surface of the slurry, and inhibits the accumulation of scum or crust at the incoming end.

Manholes are positioned in the top of the digester for access to the slurry and include side baffle walls which extend downwardly from the manhole opening to a position below the surface level of the slurry. This arrangement prevents any large escape of gas through the manholes as during inspections while the digester is in operation. The manholes also allow various agitators and the like to become positioned within the digester to agitate the slurry as needed.

Heating pipes are positioned within the digester to retain the slurry at an optimum temperature between approximately 95 and 98 degrees Fahrenheit. The pipes are in flow communication with an exhaust manifold heat exchanger on of the internal combustion engine and water flow through the pipes is controlled by a pump actuated by a time of day clock. The clock allows a user of the digester to utilize hot water produced by the engine to either heat the digester to the required temperature or pump the hot water produced by the internal combustion engine to other associated heat devices such as pasteurizing equipment for dairy cattle as needed.

OBJECTS OF THE INVENTION

The objects of the present invention are: to provide a gas producing and handling system for use in the generation of electricity which is usable with a continuous and variable gas supply without the need of external storage tanks; to provide such a system which includes an internal combustion engine driving an induction generator with the internal combustion engine including a throttle controlled by a supply sensing throttle regulator which senses the variations in the production of gas by the gas supply; to further provide such a system usable with a wide variety of gas supplies such as anaerobic digesters, municipal sewage sanitation plants, land fill gas supplies, natural gas wells, sour gas wells, and pulp gasification plants; to provide an anaerobic digester for such a system including a rigid enclosure tank having a small gas space between a surface of a slurry contained therein and the top of the tank; and to provide such a system which is easy to install without large additional storage tanks capable of continuous production of electricity at variable gas supplies and particularly well adapted for the intended usage thereof.

Other objects and advantages of this invention will become apparent from the following description taken in conjunction with the accompanying drawings wherein are set forth, by way of illustration and example, certain embodiments of this invention.

BRIEF DESCRIPTION OF THE DRAWINGS

FIG. 1 is a cross-sectional view of a gas producing and handling system embodying the present invention and showing an anaerobic digester as a supply of combustible gas.

FIG. 2 is a side elevational view of an internal combustion engine and induction generator unit which is powered by gas from the gas supply.

FIG. 3 is a schematic view of a supply sensing throttle regulator for use with the present invention.

DETAILED DESCRIPTION OF THE PREFERRED EMBODIMENT

Figure 4:
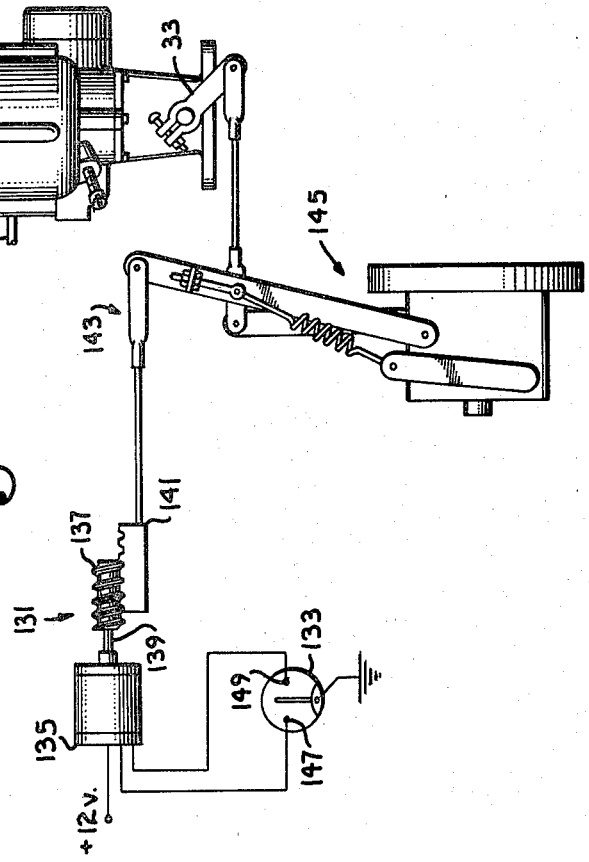
FIG. 4 is a cross-sectional view of the anaerobic digester shown in FIG. 1 taken along line 4—4 in FIG. 1.

As required, detailed embodiments of the present invention are disclosed herein, however, it is to be understood that the disclosed embodiments are merely exemplary of the invention which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a gas producing and handling system according to the present invention. As shown herein, the gas system 1 is used to produce and convert the energy stored in a combustible gaseous fuel to a usable form, such as electrical energy which can be used by the user of the device and fed into the power grid of a local utility 2. Another use is as heat energy in appliances 4 which use gas as a fuel. The gas system 1 comprises a supply 3 of gaseous fuel, a combustion means 5 which consumes the gaseous fuel and which in turn drives a suitable electrical generator 7 electrically connected to the local utility 2 for producing the electrical power. Preferably, the generator 7 is an induction generator. However, a synchronous generator could be utilized. The gaseous fuel supply 3 includes a generally rigid reservoir or enclosure in which the gas is produced or, at least, trapped and is shown herein as being an anaerobic digester 9 in which a slurry 11 of organic waste is decomposed anaerobically and emits a combustible gaseous fuel such as methane. It is, however, envisioned that the gas system 1 can be utilized with numerous and diverse gas supplies other than digesters including, but not by way of limitation, the following: municipal sanitation sewage plants; land fills which have existed long enough for the fill to decompose and produce the combustible gas; wood pulp gasification plants which produce a combustible gas; natural gas wells, and the like.

In the above types of gas supplies, the amount of combustible gas produced over a unit period of time usually fluctuates. Most prior systems which utilized the gases produced by such a gas supply for the source of fuel for the internal combustion engine include large external storage tanks. The present invention eliminates the necessity of such storage tanks.

As shown herein, the anaerobic digester 9 comprises a rigid tank 17 having a top portion 19 which is positioned a small distance, approximately 2 feet, above a surface 21 of the slurry 11 and defining a gas space 23 therebetween. In order to prevent the potentially dangerous accumulation of gas within the gas space 23, the associated combustion means 5, shown here as comprising an internal combustion engine 25, has a gas supply sensing throttle regulator 27. The internal combustion engine 25 includes an intake apparatus 29 including an intake manifold (not shown) and a carburetor 31 which is in gaseous flow communication with the digester 9 by means of a suitable supply conduit 30. The carburetor 31 includes a throttle 33 which varies the amount of fuel used by the engine 25 and to which the throttle regulator 27 is connected.

The throttle regulator 27 is in gaseous flow communication with the gas within the gas space 23 through suitable conduits 34 and senses fluctuations in the gas pressure. As the pressure increases within the gas space 23, the throttle regulator 27 opens the carburetor throttle 33 to increase the consumption of gaseous fuel by the engine 25. Conversely, as the amount of gas within the gas space 23, and hence the pressure therein, is decreased the throttle regulator 27 will cause the throttle 33 to close, decreasing the fuel consumption of the engine 25. Because the consumption of the gas produced by the engine 25 increases as the production of gas in the digester 9 increases, there is no need for any large external storage tanks for gas as the total quantity of gaseous fuel generated by the supply 3 is continuously being consumed by the engine 25 and converted to electrical energy by the generator 7. This allows the digester 9 to be compact in design and, as shown in FIG. 1, allows the digester tank 17 to be constructed below a soil surface 37 so as not to substantially interfere with other intended usages of the surrounding area.

In the example shown in FIG. 3, the throttle regulator 27 includes an enclosed diaphragm body 41 having a diaphragm 43 therein. The diaphragm 43 is subjected to the pressure within the digester gas space 23 by means of a tube 34 which extends into the digester gas space 23 and is in communication with an interior 46 of the diaphragm body 41. The diaphragm 43 is connected to a suitable plunger 47 which extends outwardly from the diaphragm body 41 and is connected through linkage 49 with the carburetor throttle 33. An adjustable tension spring 51 is provided to adjust the positioning of the throttle, and thereby regulate the consumption of gas by the engine 25 at a given pressure within the gas space. When the pressure within the gas space 23 increases, the pressure within the diaphragm body interior 46 increases, expanding the diaphragm 43 which in turn moves the throttle linkage 49 and rotates the throttle 33 into a more open position and increases the gas consumption of the engine 25. As the pressure within the gas space decreases, the tension within the spring 51 urges the linkage 49 and plunger 47 back to a slower running position by closing the throttle 33 and decreasing the gas consumption of the engine.

The generator 7 is preferably an induction generator which produces electrical power whenever it is rotated at a rotational speed (rpm) greater than the synchronous speed or rpm of the generator. Therefore, as the consumption and hence output, measured in rpm, of the engine 25 increases as the supply of gas in the gas space 23 increases, the generation of electricity by the induction generator 7 likewise increases.

The digester 9 includes a first and a second chamber 59 and 61 respectively and is of a "plug flow" design. A charge of slurry 11 is injected daily into a front or influent end 63 of the first chamber and causes a similar volume of slurry 11 to be forced out of a second or effluent end 65 of the first chamber 59 and into a second chamber 61 which acts as separator 67. Preferably, the relationship between the amount of each individual charge and the total volume of the digester 9 is such that the charge is one one twelfth to one thirtieth of the total volume of the digester. Accordingly, that portion of the slurry 11 which comprises a single charge resides within the digester for 12 to 30 days.

The digester 9 includes side walls 69 and 71, a front wall 73, a back wall 75, a bottom 77 and a top 79. The daily charge of new slurry 11 is injected into the digester by means of an inlet pipe 81 which, as shown in FIGS. 1 and 4, extends inwardly from side wall 69 to a point near the middle of the digester and above the slurry surface 21. The inlet pipe 81 emits the daily charge of slurry toward the digester front wall 73 onto the slurry surface 21. By emitting each daily charge of slurry onto the existing slurry surface 21, the production of scum on the surface is inhibited because the new charge is typically wetter than the slurry surface 21 and the new charge, as it lands on the slurry surface 21, acts to break down any scum or crust being formed thereon.

Since the intake pipe orients the new charge of the slurry toward the front wall 73, proper plug flow digester flow is maintained because each individual daily new charge is forced against the front wall 73 instead of being oriented in a direction toward the bulk of the slurry 11 where the new charge would be intermixed with the slurry 11 which has resided in the digester 9 for a period of time. This results in a more efficient digester because the new charge of slurry 11 usually has a lower temperature than the preferred temperature of the slurry already in the digester 9, normally 95 and 98 degrees Fahrenheit (F.) for optimum anaerobic action. If the new charge of slurry 11 is interspersed with that which is already in the digester, optimum efficiency will likely not be maintained.

Manholes 85 and 87 are provided in the digester top portion 79 and allow access to the slurry 11 while the digester 9 is operating, such as for positioning and maintaining agitators 89. In the example illustrated in FIG. 1, the manholes 85 and 87 include side wall baffles 91 which extend downwardly to below the slurry surface 21. Thus, when opening the manholes 85 and 87 for access to the slurry 11, only a very small portion of the combustible gas produced in the digester escapes. Usually, only the gas from the slurry immediately below the manholes 85 and 87 can escape.

In the embodiment shown in FIG. 1, an outlet passage 94 extends through the digester back wall 75 and is associated with a weir or baffle 95 on the separator side of the back wall 75 having an overflow end generally above the surface level of the slurry in the digester. As the slurry 11 flows through the outlet passage 94, there must be sufficient volume or pressure on the slurry in the digester to cause the slurry to rise above the upper edge of the baffle and flow into the separator 67 wherein the liquids are separated from any remaining solids for easy disposal. The outlet passage 94 and weir or baffle 95 are positioned generally at an upper portion of the back wall 75 facilitating the removal of scum from the digester as set forth hereinbelow.

In use, the internal combustion engine 25 preferably operates continuously, driving the generator 7 and consuming the gas produced by the digester 9. In the recommended practice, a user of the system 1 will turn off the engine 25 once a day for maintenance, such as checking the level of engine oil, etc. While the engine 25 is off, the amount of gas contained in the gas space increases, resulting in an increase of pressure in the gas space. As set forth above, the level of the slurry 11 in the manholes 85 and 87 and weir or baffle 95 is always higher than that of the slurry in the digester first chamber 59. The separator and manholes 85 and 87 are open to the external atmosphere whereas the gas space 23 is at a pressure greater than the atmosphere. When the pressure in the gas space 23 increases as when the engine 25 is shut down, the pressure differential between that in the gas space 23 and atmosphere tends to force the slurry 11 through outlet passage 94 and up and over the weir or baffle 95 and into the separator 67. Since the weir or baffle 95 is exposed to the slurry 11 near the slurry surface 21, generally only the surface portion of the slurry 11 carrying the scum or crust is forced through the weir or baffle 95, thereby driving off and inhibiting the accumulation and further production of scum on the slurry surface 21.

Figure 6:
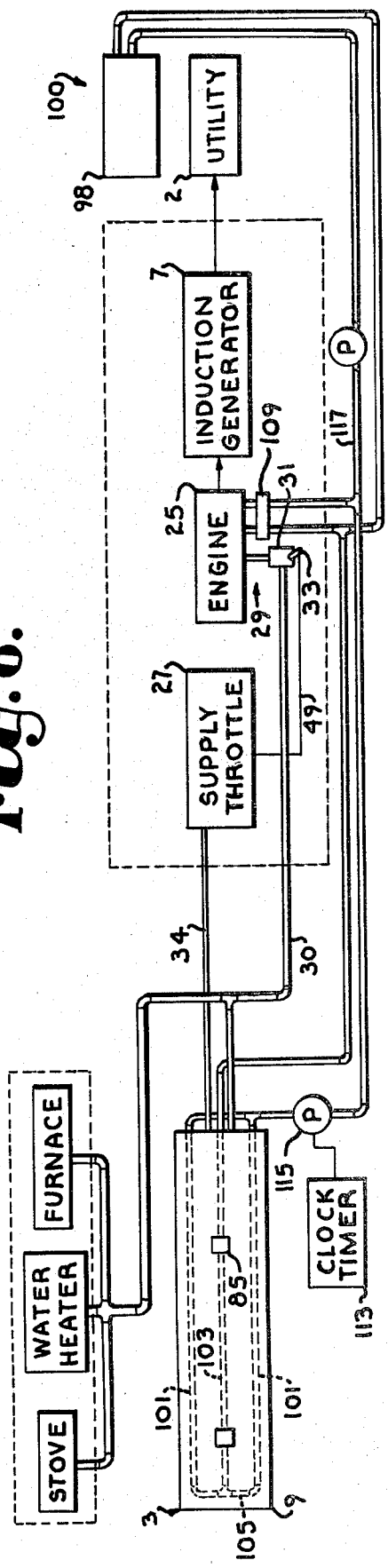
FIG. 6 is a diagram of the gas producing and handling system according to the present invention.

A heating system 99 is provided to heat lower and perimeter portions of the slurry in order to maintain the slurry 11 at optimum operating temperatures. In the illustrated example, the heating system 99 includes pipes 101 which extend down the sides of the digester and a pipe 103 which extends down the middle. The pipes 101 and 103 are connected at the back of the digester by means of associated piping 105. The heating system 99 is in communication with the internal combustion engine 25 and derives heat from hot engine areas, such as the water jacket (not shown) or exhaust heat exchanger 109. As shown schematically in FIG. 6, the hot water produced as a result of combustion in the engine is also used to heat various other appliances 110 of the user, thereby increasing the total efficiency of the gas system 1. For example, if the gas system 1 is associated with a dairy, the hot water produced in the internal combustion engine 25 can be used to heat the pasteurizers 98. Other devices which utilize heat can be connected to this system for a source of heat.

The heating system 99 further includes a time of day clock 113 which operates a pump 115 in a water conduit 117 connecting the internal combustion engine 25 and the digester pipes 103 and 105. The time of day clock 113 is set to open the pump 115 during those portions of the day during which water can be diverted to the digester 9 without interfering with other uses. The length of time the pump 115 is on can be varied by adjusting the clock 113 to insure that the temperature in the digester 9 remains constant.

Figure 5:
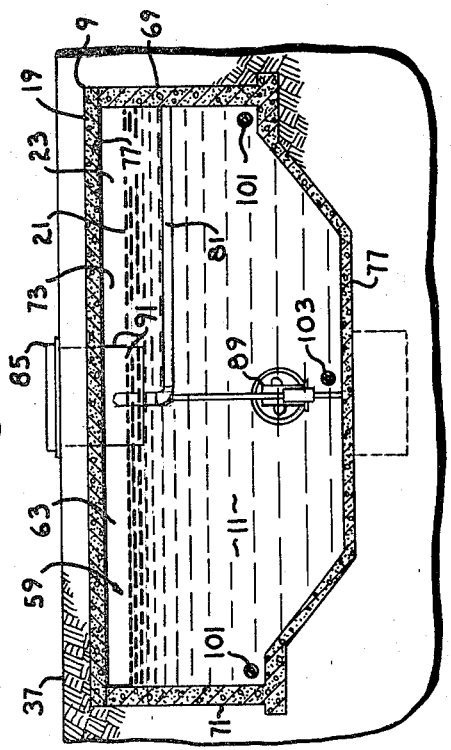
FIG. 5 is a partially schematic view of an alternate embodiment of the supply sensing throttle regulator.

FIG. 5 shows schematically an alternate embodiment of a pressure sensing throttle regulator 131 which can be used with the present invention. The throttle regulator 131 includes a two-way pressure sensing switch 133 which senses the pressure within the digester gas space. The switch 133 is connected to a suitable direct current electrical motor 135 which includes a worm gear 137 retained on a motor shaft 139. The worm gear 137 engages a gear block 141 comprising a part of a throttle linkage 143 which is in turn connected to the carburetor throttle 33. A governor 145 supplied with the linkage 143 regulates the maximum engine speed.

As the pressure within the gas space increases, a first terminal 147 of the switch 133 moves in a ground position, closing a circuit in the motor and causing the motor 135 to rotate in a direction which will urge the linkage 143 to open the throttle 33. Conversely, as the pressure within the gas space decreases, a second terminal 149 of the switch 133 moves into a ground position, closing a second circuit and causing the motor to rotate in a second direction opposed to the previous rotation. This causes the linkage 141 to close the throttle 33.

It is to be understood that while certain forms of the present invention have been illustrated and described herein, it is not to be limited to the specific forms or arrangement of parts described and shown.

What is claimed and desired to secure by Letters Patent is:

1. A combination fuel production and energy conversion system comprising:
   (a) source means providing a supply of gaseous fuel variable in pressure;
   (b) engine means adapted to consume said gaseous fuel and produce mechanical energy and having an intake apparatus for inward flow of said fuel;
   (c) conduit means connecting said source means and said intake apparatus for flow of fuel therethrough;
   (d) a throttle operably connected to said intake apparatus and regulating the amount of fuel consumed by said engine means per a unit of time; and
   (e) pressure sensing means communicating with said supply of gaseous fuel and connected to said throttle so as to generally maintain a given pressure of said supply in said source means; said pressure sensing means being responsive to an increase in pressure of said supply above said given pressure to activate said throttle and cause relatively more fuel to be used per unit of time by said engine and responsive to a decrease in pressure of said supply below said given pressure to activate said throttle and cause relatively less fuel to be used per unit of time by said engine whereby substantially all of said fuel provided by said supply means in said unit of time is consumed by said engine.

2. The system as set forth in claim 1 including:
   (a) an electrical generator driven by said engine for producing electrical energy.

3. The system as set forth in claim 2 wherein:
   (a) said generator is electrically connected to a utility power grid for transferring electrical energy thereto.

4. The system as set forth in claim 2 wherein:
   (a) said electrical generator is an induction generator which produces electrical energy when driven at a rotational speed greater than a synchronous speed of said generator.

5. The system as set forth in claim 1 wherein:
   (a) said source means includes an anaerobic digester in which organic wastes are decomposed anaerobically; and
   (b) said gaseous fuel is methane.

6. The system set forth in claim 1 wherein:
   (a) said source means includes a landfill having decomposing organic wastes.

7. The system set forth in claim 1 wherein:
   (a) said source means includes a wood pulp gasification plant.

8. The system as set forth in claim 1 wherein:
   (a) said source means supplies fuel having a gaseous pressure directly related to a rate of production of said gaseous fuel by said source means; and
   (b) said pressure sensing means is a supply responsive throttle regulator comprising:
      (1) an enclosed body having a diaphragm retained in an interior thereof; said body including conduit means maintaining said interior at the pressure of said supply means, said diaphragm being connected to a linkage attached to said throttle such that an increase and decrease in gaseous pressure biases said diaphragm, said linkage respectively opening and closing said engine throttle.

9. The system as set forth in claim 1 wherein:
   (a) said source means comprises a digester.

10. The system as set forth in claim 9 wherein:
    (a) said digester comprises an enclosure adapted for holding organic wastes; said enclosure having generally rigid surrounding walls and a rigid top.

11. In a gas producing and handling system, including a digester and an internal combustion engine wherein organic wastes are decomposed in the digester, thereby producing a gaseous fuel capable of being combusted by the engine; said system further including means for supplying the fuel from the digester to the engine and the engine having fuel intake means and a throttle, the improvement comprising:
(a) said means for supplying the fuel operatively supplies the fuel directly from said digester to said engine throttle; and
(b) gas supply sensing means communicating with said digester and responsive to fluctuations in pressure of said gaseous fuel in said digester, said sensing means being operatively connected to said engine throttle so as to regulate combustion of the gaseous fuel by said engine to substantially maintain a given pressure of the gaseous fuel in said digester by activating said throttle to deliver relatively more gaseous fuel to said engine per unit time when the pressure in said digester goes above said given pressure and to deliver relatively less gaseous fuel to said engine per unit time when the pressure in said digester goes below said given pressure, whereby substantially all of the gaseous fuel produced by said digester is consumed by said engine.

12. The improvement set out in claim 11 wherein said digester comprises:
(a) an enclosure having rigid surrounding walls housing said organic wastes and the gaseous fuel therein.

13. A combination fuel production and energy conversion system comprising:
(a) a digester defined by rigid surrounding walls to provide an enclosure tank for the deposit of a slurry containing organic waste, said enclosure tank having an influent end with an end wall associated therewith and an effluent end with an end wall associated therewith and a top wall, said slurry normally having an upper surface associated therewith during operation of the digester positioned at a predetermined height within said tank;
(b) slurry input means for introducing untreated slurry into said enclosure tank at said influent end, said input means comprising a pipe discharging said untreated slurry into said tank at a position above said slurry surface and in a direction toward said enclosure tank end wall;
(c) means defining an access hole in said top and extending into said tank, said hole having side walls forming baffles extending downward from said tank top to a position below said slurry surface, said hole being normally closed by a cover;
(d) an engine adapted to use said combustible gas as a fuel and having an intake manifold and a carburetor in gaseous flow communication with said enclosure tank and including a throttle; said engine having an internal water cooling jacket;
(e) a pressure sensitive throttle regulator adapted to sense the gaseous pressure within said enclosure tank above said slurry surface and to maintain said gaseous pressure at a predetermined given pressure, said throttle regulator including linkage means connected to said throttle so as to activate said throttle to increase the speed of said engine and consequently use relatively more of said gaseous fuel when said gaseous pressure increases and to decrease the speed of said engine and consequently use relatively less of said gaseous fuel when said gaseous pressure decreases; and
(f) heat exchanger piping positioned in said tank below the level of said slurry and in heat flow communication with said engine water jacket, said piping being associated with a pump for selectively driving fluid therethrough and having a time of day clock operably connected to said pump for activation of said pump during predetermined periods of each day.

14. The system set forth in claim 12 including:
(a) an induction generator driven by said engine, said generator connected to a utility for transmitting electrical power thereto.

15. A combination fuel production and energy conversion system comprising:
(a) a source means providing a supply of gaseous fuel variable in pressure; said source means provides said gaseous fuel having a pressure directly related to a rate of production of said gaseous fuel by said source means;
(b) an engine means adapted to consume said gaseous fuel and produce mechanical energy and having an intake apparatus for inward flow of said fuel;
(c) conduit means connecting said source means and said intake apparatus for flow of fuel therethrough;
(d) a throttle operably connected to said intake apparatus and regulating the amount of fuel consumed by said engine means per a unit of time;
(e) pressure sensing means communicating with said supply of gaseous fuel and connected to said throttle; said pressure sensing means being responsive to an increase in pressure of said supply to activate said throttle and cause more fuel to be used per unit of time by said engine whereby substantially all of said fuel provided by said supply means in said unit of time is consumed by said engine; and
(f) said pressure sensing means is a supply responsive throttle regulator comprising:
(1) a linkage attached to said engine throttle;
(2) a bi-directional electrical motor having a rotating shaft, attached to said linkage for movement of said linkage to vary a setting of said throttle;
(3) an electrical switch having first and second contacts and a ground such that when said first contact is grounded said motor shaft rotates a first direction and when said second contact is grounded said motor shaft rotates in an opposite direction; and wherein
(4) said switch includes pressure sensing means responsive to the fluctuations of said gaseous pressure and engageable with said switch grounding one of said two contacts for changing said throttle setting.

* * * * *